J. BECKER.
AMMONIA AND TAR RECOVERY PROCESS.
APPLICATION FILED AUG. 12, 1918.
1,307,533.
Patented June 24, 1919.
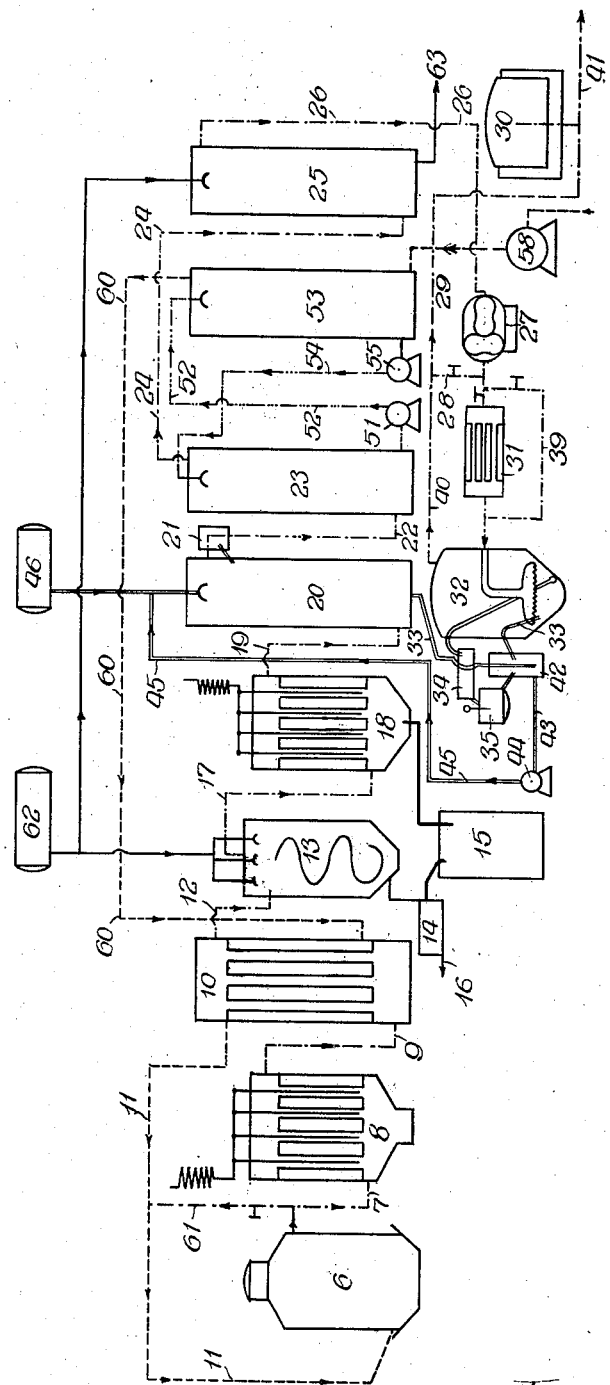

UNITED STATES PATENT OFFICE.

JOSEPH BECKER, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

AMMONIA AND TAR RECOVERY PROCESS.

1,307,533.   Specification of Letters Patent.   Patented June 24, 1919.

Application filed August 12, 1918. Serial No. 249,378.

*To all whom it may concern:*

Be it known that I, JOSEPH BECKER, a subject of Germany, who have declared my intention of becoming a citizen of the United States, and residing in Pittsburgh, in the county of Allegheny and State of Pennsylvania, have invented a new and useful Improvement in Ammonia and Tar Recovery Processes, of which the following is a specification.

My invention relates primarily to the recovery of tar and of ammonia from producer-gas and has for its object the efficient production of a clean, dust-free and high-grade tar and of a clean, tar-free and dry ammonium sulfate that has a high content of ammonia and is of the large crystal type and is produced with great economy of heat or steam and with simplicity and directness in the operation of apparatus; and the invention may also be applicable to the treatment of gas that is otherwise derived from the carbonization of coal, and may also have such other objects and results as are found to obtain in the processes hereinafter set forth and claimed.

In the accompanying drawings, Figure 1 is a conventional diagram illustrating an embodiment of the invention in a preferred arrangement of apparatus for practising its processes; and Fig. 2 is a key to the symbols employed in the various lines that show the connections between the apparatus indicated in Fig. 1.

6 indicates the producer, from which the evolved producer-gas passes through the gas line 7, to the electrical precipitator 8. The producer-gas entering this electrical precipitator is still at very high temperature, about 450° C., and its water saturation point is only about 80° C., and therefore it is still greatly superheated in respect of its water and tar, and these, and its other vaporizable content, are carried as vapor into and through such precipitator 8, and said precipitator acts only to free the passing gas from dust and other solid impurities in its current. From said precipitator 8 the gas, without having undergone appreciable cooling, passes through the gas line 9 to the superheater 10, through which it flows in counter-heater with the saturated air that is on the way to the producer. This saturated air has a temperature of about 70° C. when it enters the said superheater 10; and as a result of the heat interchange in passing through the superheater, the gas issues with its temperature reduced to about 280° C., and the air issues with its temperature raised to about 220° C. and at such temperature passes through the air-line 11 to the grate of the producer 6. The partially cooled gas from the said superheater 10 passes through the gas line 12, still carrying its water and tar as vapor, to the water-sprayed cooler 13, which is of the character of a cyclone precipitator and has the primary function of further cooling the gas to a large extent, and the incidental function of further cleaning such gas by precipitating any residue of dust or other solid impurities. A slight amount of the tar may also be taken out in said cooler 13 and require to be drained from its discharge trough 14 into the tar tank 15, the waste water from said trough 14 discharging through the outlet pipe 16. But nearly all of the tar is carried through said cooler as vapor in the gas, because the gas enters, as above mentioned, at a temperature of about 280° C., and leaving said cooler is still superheated, though cooled down toward about 90° C. Such gas passes through the gas line 17 to the electrical precipitator 18, which it enters at a temperature of about 90° C., and at such temperature the tar, approaching the character of a finely comminuted mist, will be precipitated; and the clean tar so precipitated is discharged into the tar tank 15. The gas passes from said tar-precipitator 18, through the gas line 19, to the hot acid-washer tower 20, which it enters at a temperature of about 85° C., still a little above its saturation point of 80° C. In said acid tower the ammonia is absorbed from the gas, and the ammonia-freed gas leaves the acid-washer at a temperature of about 82° C., still slightly above its saturation point of 80° C., the acid-solution being kept hot by the absorption reaction, so that there can not be any diluting of the ammonia-absorbing acid-solution that is flowing through said acid-washer; and by reason of the little superheat remaining in the gas practically no water is picked up by the gas in passing through said acid-washer, and so there is no precipitation of ammonium sulfate in said acid-washer. Thence the ammonia-freed gas flows through the acid separator 21, in which it is freed of such acid as it may carry with it, and then flows through the gas line 22 into the first-stage final-cooler 23, through which it flows in counter-current with warm water that enters such cooler at about 50° C. In this cooler the gas is cooled to about 65° C. and to a great extent dehydrated, and thence passes, through the gas line 24, to the second-stage final-cooler 25, through which it passes in counter-current with cold water of about 25° C. and issues finally dehydrated and cooled to a temperature of about 25° C. Such clean, cool and relatively dry gas is drawn off through the gas line 26, by the exhauster 27. The main portion of such gas goes through the by-pass 28 and gas line 29 to the gas-holder 30; but a limited portion is forwarded through the small reheater 31, to the ammonia saturator 32. This saturator 32 receives the ammonia-charged acid-solution that is carried to it through the acid-line 33, from the acid-tower 20. The somewhat superheated but ammonia-freed producer-gas that flows into and through the saturation-bath in said saturator, 32, serves to effect the evaporation requisite to precipitate the ammonium sulfate, in the ordinary manner of such precipitation in a saturator; and this ammonium sulfate is drawn off from the saturator in the usual manner and passes over the drain-table 34 and into the centrifugal drier 35, from which it is discharged to the conveyer-belt, to be carried to the storage bin of the by-product house, and this ammonium sulfate has the dry, clean and large crystal character, with high ammonia content, of the high-grade ammonium sulfate that may be derived from saturator-processing of coke-oven gas. The reheater 31 is required to heat the gas, from the exhauster 27, only a few degrees, as at a temperature of about 35° C. such gas will carry sufficient heat into the saturator to effect the requisite evaporation from the saturation-bath; and if a considerably greater proportion of the total dry gas, from the final coolers, is forwarded by said exhauster to the saturator, the reheater may be cut out, through the by-pass 39, as sufficient heat will be derived from the adiabatic compression of the gas in the exhauster.

The producer gas from the producer, until it reaches the final coolers 23, 25, carries a great amount of water-vapor and its volume in such superheated condition is enormously greater than after it has been dehydrated and cooled in the final coolers. In its dried and cooled condition a far less volume is required to pass through the saturator, even if the total dry gas is passed through, and the saturator is not required to be of impracticably large dimensions; and such gas requires only a low superheat when introduced into the saturator, and can not effect any dilution of the saturation-bath.

The gas put through the saturation-bath issues from the saturator and passes through the gas-line 40, 28 to the gas-holder and thence through the distribution gas-line 41.

The acid-solution from the drain-table 34 is received in the mother-liquor tank 42, which also receives, from the acid-line 33, the acid-solution that by-passes the saturator; and the acid-solution received in said tank 42 is drawn through the further acid-line 43 to the acid-pump 44 and thence is forwarded through the return acid-line 45 to the acid-washer 20, receiving also fresh acid from the acid tank 46, such returned acid-solution being still sufficiently heated to prevent cooling of the acid-solution that is receiving heat from the absorption reaction in said acid-washer. A continuous circulation of hot acid-solution is maintained through the acid-washer and thence to the saturator, and back to the acid-washer.

The aforesaid first-stage final-cooler 23 receives its water at a temperature of about 50° C. and discharges it at a temperature of about 80° C. and such discharged hot water is forced through the hot water-line 52, by the hot water pump 51, to the air-saturator tower 53; and from that tower the water issues cooled to a temperature of about 50° C. and is forced through the warm water-line 54, by the warm water pump 55, to the said first-stage final-cooler 23 in which the ammonia-freed producer-gas undergoes the first stage of its final cooling.

The air that is saturated and superheated and led to the gas-producer, as before mentioned, is drawn in from the outside through the fan 58 and thence is forwarded to the aforesaid air-saturator tower 53, which it enters at a temperature of about 25° C. In this tower 53 this air passing through the water introduced from the before-mentioned hot water-line 52, is heated and takes up water vapor and issues saturated, at a temperature of about 70° C., and passes through the air-line 60 to the before-mentioned superheater 10, through which it passes in counter-current with the hot producer-gas, as also before mentioned, and is thereby superheated to about 220° C., and passes out and to the producer 6 through the superheated air-line 11. A portion of the hot producer-gas issuing from the producer may be introduced into this air-line 11 through the by-pass 61 connecting said air-line 11 with the primary gas-line 7, as a further control of the heat and gasification conditions in the gas-producer 6. The fresh water tank for coolers 13 and 25 is indicated at 62, and the drains from these coolers are at 16 and 63 respectively.

The processes of the invention may be practised in various ways, other than the particular embodiment that has been described for purposes of illustration, and still be within the scope and subject matter of the claims hereinafter made.

The two-stage electrical precipitation of the dust and tar is a separate invention set forth in the application Serial No. 249,381 filed August 12, 1918, by Joseph van Ackeren, of Pittsburgh, Pennsylvania, at the same time herewith.

I claim:

1. In a process for the recovery of ammonia from producer-gas, the combination of steps that consists in: absorbing the ammonia from the dust-freed and tar-freed producer-gas by passing such gas, at nearly its saturation temperature, through an acid-wash; conveying the mother-liquor from such acid-wash to a saturation-bath; cooling and dehydrating the ammonia-freed gas; and then passing such gas through said saturation-bath, to effect deposition of the ammonium sulfate; substantially as specified.

2. In a process for the recovery of ammonia from producer-gas, the combination of steps that consists in: absorbing the ammonia from the dust-freed and tar-freed producer-gas by passing such gas, at nearly its saturation temperature, through an acid-wash; conveying the mother-liquor from such acid-wash to a saturation-bath; cooling and dehydrating the ammonia-freed gas and then somewhat reheating a portion of it; and then passing such portion through said saturation-bath, to effect deposition of the ammonium sulfate; substantially as specified.

3. In a process for the recovery of tar and ammonia from producer-gas, the combination of steps that consists in: electrically precipitating the dust from the hot gas from the producer; then passing said gas in counter-current with the air going to the producer, to superheat said air and partially cool said gas; then further cooling and washing said gas with water; then electrically precipitating the residue of the tar from such partially cooled but still hot gas; then passing such still hot and tar-freed gas through an acid-wash to absorb the ammonia; conveying the mother-liquor from the acid-wash to a saturation-bath; passing the ammonia-freed gas through final cooling and dehydrating stages and thence partly to the gas-holder and partly to and through a reheating operation; and then passing such reheated portion of the gas through said saturation-bath, to effect deposition of the ammonium sulfate; withdrawing and draining the ammonium sulfate and returning the liquor from such draining, with addition of fresh acid, to the acid-wash; heating and saturating the air, on its way to its aforesaid superheating, by passing such air in counter-current with the hot water from the first stage of the aforesaid final cooling of the gas; and conveying the water from said air heating operation back to the first stage of the final gas-cooling; and conveying the gas from the saturation-bath to the gas-holder; substantially as specified.

4. In a process for the recovery of ammonia from producer-gas, the combination of steps that consists in: absorbing the ammonia from the tar-freed gas by passing said gas through an acid-solution at a temperature sufficiently above the saturation-point of the gas substantially to preclude diluting of said solution and yet at a temperature near enough said saturation-point substantially to preclude deposition of ammonium sulfate in said acid-solution; conducting the ammonia-charged acid-solution into a saturation-bath; cooling and dehydrating the ammonia-freed gas; and then forcing a portion of said gas through such saturation-bath, with enough superheat to effect deposition of the ammonium sulfate; substantially as specified.

5. In a process for the recovery of tar and ammonia from producer-gas, the combination of steps that consists in: extracting the tar while the gas is superheated; absorbing the ammonia from the tar-freed gas by passing said gas through an acid-solution at a temperature sufficiently above the saturation point of the gas substantially to preclude diluting of said solution and yet at a temperature near enough said saturation-point substantially to preclude deposition of ammonium sulfate in said acid-solution; conducting the ammonia-charged acid-solution into a saturation-bath; cooling and dehydrating the ammonia-freed gas; and then forcing a portion of said gas through such saturation-bath, with enough superheat to effect deposition of the ammonium sulfate; substantially as specified.

6. In a process for the recovery of ammonia from producer-gas, the combination of steps that consists in: absorbing the ammonia from the tar-freed gas by passing said gas through an acid-solution at a temperature sufficiently above the saturation-point of the gas substantially to preclude diluting of said solution and yet at a temperature near enough said saturation-point substantially to preclude deposition of ammonium sulfate in said acid-solution; conducting the ammonia-charged acid-solution into a saturation-bath; cooling and dehydrating the ammonia-freed gas; and then forcing a portion of said gas through such saturation-bath with enough superheat to effect deposition of the ammonium sulfate; and maintaining said acid-solution, kept hot by the absorption reaction, in circulation and recirculation through its ammonia-absorption and sulfate-deposition stages, with addition of fresh acid to its current; substantially as specified.

7. In a process for the recovery of ammonia from ammonia-charged gas, the combination of steps that consists in: absorbing the ammonia from the dust-freed and tar-freed gas by passing such gas, at nearly its saturation temperature, through an acid-wash; conveying the mother-liquor from such acid-wash to a saturation-bath; cooling and dehydrating the ammonia-freed gas; and then passing such gas through said saturation-bath, to effect deposition of the ammonium sulfate; the recovery of ammonium sulfate being effected with the passing of a reduced volume of gas, relatively low in heat, through a saturation-bath of restricted volume; substantially as specified.

8. In a process for the recovery of ammonia from ammonia-charged gas, the combination of steps that consists in: absorbing the ammonia from the dust-freed and tar-freed gas by passing such gas, at nearly its saturation temperature, through an acid-wash; conveying the mother-liquor from such acid-wash to a saturation-bath; cooling and dehydrating the ammonia-freed gas and then somewhat reheating a portion of it; and then passing such portion through said saturation-bath, to effect deposition of the ammonium sulfate; the recovery of ammonium sulfate being effected with the passing of a reduced volume of gas, relatively low in heat, through a saturation-bath of restricted volume; substantially as specified.

9. In a process for the recovery of ammonia from ammonia-charged gas, the combination of steps that consists in: absorbing the ammonia from the tar-freed gas by passing said gas through an acid-solution at a temperature sufficiently above the saturation-point of the gas substantially to preclude diluting of said solution and yet at a temperature near enough said saturation-point substantially to preclude deposition of ammonium sulfate in said acid-solution; conducting the ammonia-charged acid-solution into a saturation-bath; cooling and dehydrating the ammonia-freed gas; and then forcing a portion of said gas through such saturation-bath, with enough superheat to effect deposition of the ammonium sulfate; the recovery of ammonium sulfate being effected with the passing of a reduced volume of gas, relatively low in heat, through a saturation-bath of restricted volume; substantially as specified.

10. In a process for the recovery of tar and ammonia from ammonia-charged gas, the combination of steps that consists in: extracting the tar while the gas is superheated; absorbing the ammonia from the tar-freed gas by passing said gas through an acid-solution at a temperature sufficiently above the saturation point of the gas substantially to preclude diluting of said solution and yet at a temperature near enough said saturation-point substantially to preclude deposition of ammonium sulfate in said acid-solution; conducting the ammonia-charged acid-solution into a saturation-bath; cooling and dehydrating the ammonia-freed gas; and then forcing a portion of said gas through such saturation-bath, with enough superheat to effect deposition of the ammonium sulfate; the recovery of ammonium sulfate being effected with the passing of a reduced volume of gas, relatively low in heat, through a saturation-bath of restricted volume; substantially as specified.

11. In a process for the recovery of ammonia from ammonia-charged gas, the combination of steps that consists in: absorbing the ammonia from the tar-freed gas by passing said gas through an acid-solution at a temperature sufficiently above the saturation-point of the gas substantially to preclude diluting of said solution and yet at a temperature near enough said saturation-point substantially to preclude deposition of ammonium sulfate in said acid-solution; conducting the ammonia-charged acid-solution into a saturation-bath; cooling and dehydrating the ammonia-freed gas, and then forcing a portion of said gas through such saturation-bath, with enough superheat to effect deposition of the ammonium sulfate; and maintaining said acid-solution, kept hot by the absorption reaction, in circulation and recirculation through its ammonia-absorption and sulfate-deposition stages, with addition of fresh acid to its current; the recovery of ammonium sulfate being effected with the passing of a reduced volume of gas, relatively low in heat, through a saturation-bath of restricted volume; substantially as specified.

12. In a process for the recovery of tar and ammonia from ammonia-charged gas, the combination of steps that consists in: extracting the tar from the ammonia-charged gas hot; passing such hot gas through an acid-wash to absorb the ammonia of the gas; discharging the mother-liquor from such acid-wash into a saturation-bath; passing the tar-freed and ammonia-freed gas through a cooling and dehydrating operation; and passing such gas through such saturation-bath to effect deposition of the ammonium sulfate; substantially as specified.

In testimony whereof, I hereunto set my hand in the presence of two subscribing witnesses.

JOSEPH BECKER.

Witnesses:
HENRY LOVE CLARKE,
JOSEPH DVORAK.